2,407,112

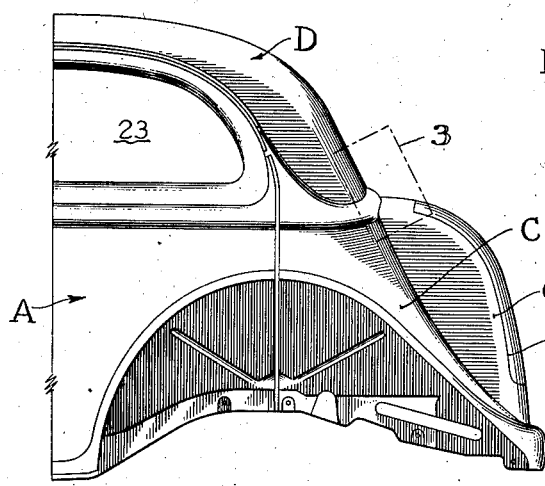
FIG. 1
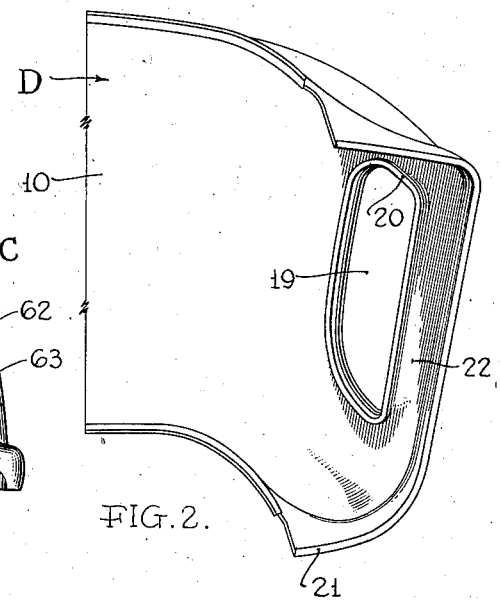
FIG. 2
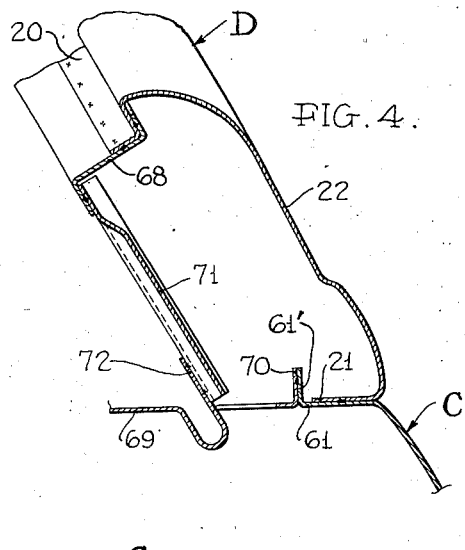
FIG. 3.
FIG. 4.
INVENTOR
GEORGE TRAUTVETTER
BY
*Donald B. Waite*
ATTORNEY Patented Sept. 3, 1946

UNITED STATES PATENT OFFICE 2,407,112

VEHICLE BODY CONSTRUCTION

George Trautvetter, Jenkintown, Pa., assignor to The Budd Company, Philadelphia, Pa., a corporation of Pennsylvania Application January 11, 1941, Serial No. 374,138, which is a division of application Serial No. 34,493, August 3, 1935, now Patent No. 2,256,837, dated September 23, 1941. Divided and this application August 7, 1943, Serial No. 497,763

1 Claim. (Cl. 296—28)

The invention relates to vehicle bodies and particularly to automobile bodies made of sheet metal. More specifically, the invention relates to the construction of a body in the region of the lower margin of a window opening.

It is an object of the invention to construct a body that combines great strength with light weight and simple design.

It is another object of my invention to so form the margins of the members entering the construction that they may be readily joined in the final assembly by readily available assembling machinery and by relatively unskilled workmen and the joints are so formed that such joinder may be effected substantially throughout by straight line spot or pinch welding in such manner that the joining may be expedited and a minimum of finishing of the joints is required after the final assembly.

These and other objects and advantages are attained, according to the invention, by an outer wall panel which extends from the belt line of the vehicle downwardly, which at the belt line extends into the interior of the body and which has in the same region its inwardly extending portion connected by flanges to outer and inner rails which latter are connected with each other along the lower margin of a window opening so that a hollow- or box-sectional structure results reinforcing the panels and rails which constitute main structural members of the body.

Other and further objects and advantages and specific means whereby they are attained will become apparent from the following more detailed description when read in connection with the accompanying drawing.

In the drawing:

Fig. 1 is a fragmentary side elevational view of the rear section of a body constructed in accordance with the invention.

Fig. 2 is a fragmentary underneath perspective view of the rear section of the roof and upper rear wall panel.

Fig. 3 is a fragmentary central vertical longitudinal sectional view in the region indicated by the dot-and-dash line 3—3 of Fig. 1.

Fig. 4 is a fragmentary sectional view similar to Fig. 3 but of a modified structure.

The body so shown in the drawing comprises side-subassemblies A, a rear subassembly C and a roof subassembly D.

The roof subassembly D in this form of the invention comprises a unitary outer panel stamping 10 extending transversely the full width of the roof and downwardly at the sides substantially to the tops of the doorway (not shown) and window openings.

At the rear the roof stamping is extended downwardly substantially to the belt line to include within its margin the rear window opening 19 in the margin of which it is flanged inwardly and rabbeted, as indicated at 20 to frame said opening and form the outer side and bottom wall of the glass run channel. The lower rear margin of the roof subassembly extends across the rear of the body and around the rear quarters substantially to the rear margins of the rear quarter window openings, and in its rear margin it is beaded and flanged inwardly at 21. The panel portion 22 below the window opening 19 constitutes with the adjoining flanges 20, 21 a rail and the bead and flange 21 provide a stiffened margin for the roof and the flange serves as part of a final assembly joint.

The rear subassembly unit or panel C extends from side to side around the rear quarter terminating in substantially vertical edges in the region just rearwardly of the rear quarter window opening 23. At the top this unit terminates at the belt and is there formed with a horizontal flange 61 terminating in an upwardly extending flange 61' extending from side to side and adapted to enter into the final assembly joint with the roof unit. In the form shown in Figs. 1 to 3, this rear unit or panel includes in the single stamping the trunk housing 62, has the trunk opening 63 within its margins, and is flanged inwardly at 64 to frame said opening.

As shown in Fig. 3, the roof unit may be reinforced in the angular flange 20 framing the rear window opening by a Z-section member 68 having its arms nesting with the angle forming the outer side and bottom of the glass receiving channel 20 and secured thereto by spot welding. The rear unit C may be extended forwardly at the top by a transversely extending inner panel stamping 69 having a flange formed in its rear edge at 70 overlapping and spot welded to the flange 61' on the rear unit. This panel 69 may be braced to the reinforcement 68 extending around the rear window opening by a brace 71 secured to a struck-out portion 72 of the panel 69 and to the arm 73 of the reinforcement 68. The members 68, 69 and 71 constitute together an inner rail structure along the lower margin of the opening 19.

The described units or members are readily assembled in the final assembly by bringing together their marginal flanged edges and spot welding them together, in most cases by straight line pinch welding operations.

The rear lower marginal flange 21 of the roof stamping overlaps the horizontal portion 61 at the upper margin of the rear unit C just rearwardly of the upwardly extending marginal flange 61' in its top margin and is secured thereto by a line of spot welds extending all the way from a position adjacent the rear of one rear quarter window 23 around the back and forwardly to a position adjacent the other rear quarter window.

It will be seen that the hereinbefore described method of assembly may be employed whether or not the rear assembly unit uses a trunk projection as shown in Figs. 1 to 3, or is extended downwardly substantially in continuation of the lines of the rear portion of the roof subassembly as shown in Fig. 4.

In the finished construction, a cross section of which is shown in Figure 3, the lower panel C, the rail portion below the rear window opening formed by part 22 of the roof stamping D and the inner rail formed by the members 68, 69 and 71 are arranged and connected in such a manner as to result in a hollow- or box-sectional structure which gives great strength to the body in the region where it is weakened by the window opening. Besides, the parts entering into the construction can be assembled by simple spot welding operations.

Most of the joints are hidden and may be effected by simple line welding operations with a pair of pinch welders. The construction is a highly practical one which lends itself to extensive variation in the various types of bodies and under various shop conditions and in the following claims it is intended to cover all such variations as readily fall within the purview of those skilled in the art.

The present application is a division of applicant's prior application "Vehicle body construction and method of fabrication," Serial No. 374,138, filed January 11, 1941, now Patent No. 2,382,923 of August 14, 1945, which in turn is a division of applicant's original application, Serial No. 34,493, filed August 3, 1935, now Patent No. 2,256,837, "Vehicle body construction and method of fabrication," of September 23, 1941.

What is claimed is:

In an automobile body made of sheet material, such as of sheet metal, an outer panel arranged substantially below the belt line, a window opening in the body above said panel, inner and outer rails at the lower edge of the window opening, said panel having its marginal portion adjacent the window opening extended inwardly beyond the outer surface of the body, said inner and outer rails having flange connections with said inwardly extending portion of the panel and being connected with each other along the margin of the window opening to form a box-section construction reinforcing the panels and rails which constitute main structural members of the body.

GEORGE TRAUTVETTER.